United States Patent [19]
Hongoh

[11] Patent Number: 5,115,374
[45] Date of Patent: May 19, 1992

[54] PORTABLE COMPUTER INCLUDING, FOR FACSIMILE TRANSMISSION, A DOCUMENT SCANNER INTEGRAL WITH THE DISPLAY MODULE

[75] Inventor: Nobuhiko Hongoh, Tokyo, Japan

[73] Assignee: U.S. Philips Corp., New York, N.Y.

[21] Appl. No.: 560,393

[22] Filed: Jul. 31, 1990

[30] Foreign Application Priority Data

Aug. 2, 1989 [JP] Japan ................... 1-201146

[51] Int. Cl.⁵ .......................... H05K 5/00; G06F 1/00
[52] U.S. Cl. ..................................... 361/393; 358/400
[58] Field of Search ............ 364/708, 705.01, 705.05, 364/705.06, 710.13; 358/400, 401, 496, 498; 379/100; 361/380, 392, 393, 394, 395, 399

[56] References Cited

U.S. PATENT DOCUMENTS

| | | | |
|---|---|---|---|
| 4,232,367 | 11/1980 | Youden et al. | 364/710.13 X |
| 4,553,219 | 12/1985 | Ueno | 364/705.01 |
| 4,566,072 | 1/1986 | Mortensen et al. | 364/710.13 X |
| 4,827,085 | 5/1989 | Yaniv et al. | 379/100 X |
| 4,833,547 | 5/1989 | Mase | 358/400 X |
| 4,980,848 | 12/1990 | Griffin et al. | 364/708 |
| 4,989,237 | 1/1991 | Kotani et al. | 358/498 X |
| 5,038,222 | 8/1991 | Saito | 358/401 |

*Primary Examiner*—Leo P. Picard
*Assistant Examiner*—Michael W. Phillips
*Attorney, Agent, or Firm*—Jack D. Slobod

[57] ABSTRACT

A laptop computer having an internal modem and facsimile adapter in its main body including a member, on one side of which is formed a touch display screen, which is pivotably mounted by means of a hinge to the main body and which is positionable between a closed position abutting the keyboard, disk drive and a CD ROM drive, and an open position in which the display screen is upright. The member includes the entire paper path for an image scanner contained in the member, which paper path extends from a paper feed slot in a free end of the member remote from the hinge and a paper release slot in the other side of the member proximate the hinge. The member is connected to the hinge by a pair of electrical connectors which are configured so that the member may be connected in either of two ways with a selected side of the member facing the keyboard during operation of the computer.

11 Claims, 2 Drawing Sheets

PORTABLE COMPUTER INCLUDING, FOR FACSIMILE TRANSMISSION, A DOCUMENT SCANNER INTEGRAL WITH THE DISPLAY MODULE

FIELD OF THE INVENTION

The invention relates to a portable computer and more particularly to one having an integral image scanner and means for converting information read by the scanner into facsimile signals.

RELEVANT ART CITATION

Recently a portable computer of the size and configuration now referred to as a laptop computer has come into use. Such a laptop computer is disclosed, for example in JP Pat. Laid-open Publn. No. 61-95423 (U.S. Pat. No. 4,742,478). This computer comprises two disk drives, an 80 column×25 line display monitor and a full size keyboard, which computer can be contained in an attaché case.

It has been known to include in such a lap top computer an internal card type communication modem. When so equipped, such a computer may transmit documents or data which it produces in electronic form to remote locations, or to receive documents or data from other computers via public telephone lines.

SUMMARY OF THE INVENTION

However, such a laptop computer with communication modem can transmit only documents or data in electronic to other machines. Therefore information such as hand-written documents, printed materials, and pictures which have not been converted into digital codes cannot be transmitted by the computer itself, so that it is usually transmitted by a separate facsimile machine. But when there is no separate facsimile machine available to the user such written or printed information cannot be sent to other machines. This may be a serious obstacle to business activity or the like, if it is necessary that such information should be urgently transmitted.

If the information of the type which the computer cannot directly transmit is read by an image scanner and converted into facsimile signals by a facsimile adapter, it can be transmitted to other machines from the computer via public telephone lines. However both an image-scanner and a facsimile adapter must be available in order to do that. For example, when a user goes to a customer with the portable computer, he needs to carry a laptop computer which may weigh is over several kilograms and also additional rechargeable batteries for the computer. In such a situation is almost impossible for the user to carry the image scanner and the facsimile adapter in addition to the above-mentioned heavy computer and batteries.

Among other things, it is an object of the present invention to provide a portable computer which has been provided with onboard facsimile pickup means, and which has advantageous properties as seen from ergonomy (accessibility, operability, portability), economy (low cost), energy conservation and other useful aspects.

According to one of its aspects, the invention realizes its object in that it provides within a display module, facsimile means including a manuscript paper path having a paper feed slot and a paper release slot, a paper feed sensor at a place in the manuscript paper path feed slot, an image scanner near the paper, and guide rollers actuated by a motor and secured at a plurality of places in the manuscript paper path. The inclusion of the facsimile means in the display module has been found to offer simple and inexpensive construction.

Said display module has a display panel on its first major side, and advantageously, is connected to said main body by hinge means incorporating display connector means, for in a closed position of said hinge means presenting a second major side, opposite said first major side, as an external area of said computer. Viewing of the display when rotated over an angle proves more easy, whereas "hiding" the display in a closed position improves sturdiness.

Advantageously, in said closed position both said paper feed slot and said paper release slot are accessible. This realizes a compact facsimile apparatus that is operable in the nature of a laptop computer.

Advantageously, said hinge means have a range of open positions, and said paper feed slot and said paper release slot both are accessible in at least a sub-range of said range. This allows for simultaneous execution of both the computer function and the facsimile function.

Advantageously, said display connector means transport said facsimile signals to said main body. This allows for double use of a modem (both for facsimile and ASCII-signals, for example), or anyway, easy physical connectibility.

Advantageously, mating first and second portions of said display connector means are detacheable with respect to each other. Various configuration advantages are so realizeable (exchange of display module, easy testing, etcetera).

Advantageously, the mating first and second portions of said display connector means mate each other in two states, in which two states said first and second major sides interchange their respective positions. This allows for more flexible physical arrangement of the computer.

Advantageously, said display connector means comprises two display connectors which are spaced apart from each other along a hinge axis. Such spaced-apart configuration improves mechanical strength.

Advantageously, said display panel having a page display mode, and said manuscript paper path having a paper drive direction that is substantially parallel to a vertical direction with respect to said page. This proves advantageous ergononmy inasmuch as it "feels" more natural than other configurations.

Advantageously, the computer in question is configured for laptop use. Such laptop configuration has now de facto been standardized. However, various aspects of the invention would be useful in other physical packaging configurations.

Advantageously, touch screen means are provided for the display panel, and the display connector means when its first and second portions are mated interconnect said display drive signals irrespective of the position of said hinge means in either position of the two positions of the first major side of the display module with respect to the second major side. Such touch screen facility is also an ergonomically useful feature.

BRIEF DESCRIPTION OF THE DRAWING

The invention will be explained in detail hereinafter, with respect to a preferred embodiment shown in the appended Figures. Therein.

DESCRIPTION OF A PREFERRED EMBODIMENT

Since a facsimile mechanism is provided on the opposite part of a display module from a display panel in the portable computer of the present invention, the information such as pictures which a conventional computer without an image scanner cannot transmit through public telephone lines, can be transmitted to other facsimile machines or computers.

In addition, a touch panel is provided on the surface of the display panel so that manuscripts can be sent to other locations through the operation of the touch panel after setting the manuscript paper irrespective of the display module being raised or closed.

The embodiments of the portable computer of the present invention will be explained in accordance with the drawings.

In the Figures, various legends are used as follows:

| | |
|---|---|
| 1: display module | 2: main body |
| 3: paper feed slot | 4: paper release slot |
| 5: display connector | 6: display panel |
| 7: keyboard | 8: floppy disk drive |
| 9: CD ROM drive | 10: power switch |
| 11: retractable handle | 12: mouse connector |
| 13: contrast control knob | 14: brightness control knob |
| 15: touch screen | 16: paper feed sensor |
| 17: paper guide roller | 18: motor |
| 19: image scanner | 20: paper guide roller |
| 21: communication modem | 22: hard disk drive |
| 23: power supply | 24: mother board |
| 25: telephone line modular jack | |
| 26: handset modular jack | |

Figure 3:
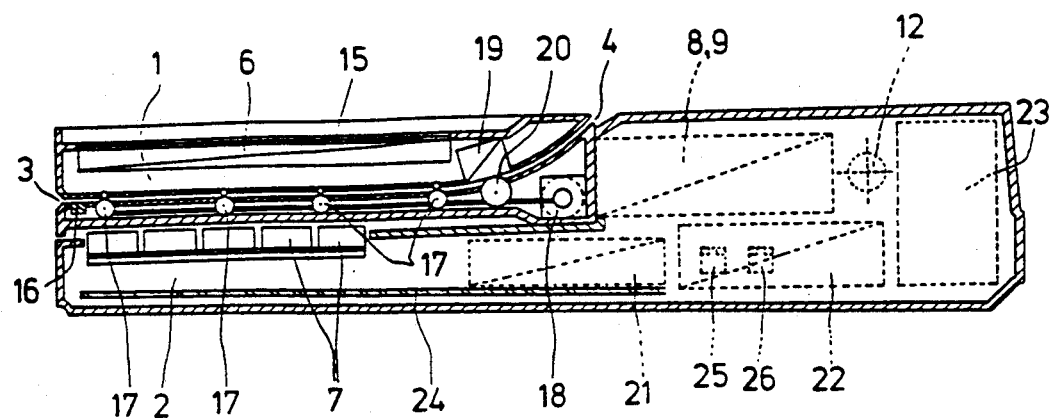
FIG. 3 is a cross-sectional view of the computer according to the invention.
Figure 4:
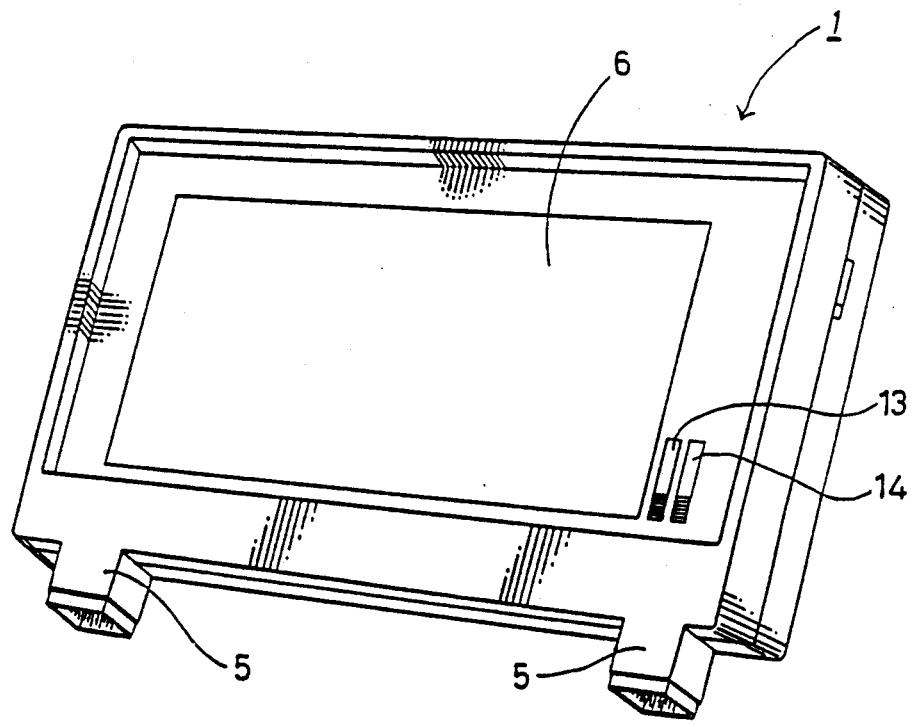
FIG. 4 is a view of the display module.

The portable computer of the present invention principally comprises display module 1 and main body 2. Display module 1, as shown in FIG. 4, has on its first major side, a display panel 6 using color liquid crystal a pair of display connectors 5 are incorporated in hinge means which pivotally connect the display module to the main body. The pair of display connectors 5 are spaced apart along a hinge axis of the hinge means. Brightness control knob 13 and contrast control knob 14 are provided at the side of liquid crystal display panel 6. As shown in FIG. 3, the cross-sectional view of FIG. 1, display panel 6 on the surface of which touch screen 15 is secured is provided on the first major side of display module 1, while there is provided only a solid wall on the second major side of display module 1. A facsimile mechanism is arranged within display module 1, as shown in FIG. 3. The facsimile mechanism comprises a manuscript paper path arranged between paper feed slot 3 and paper release slot 4, four small paper guide rollers 17 and a large paper guide roller 20 which are provided along the manuscript paper path, motor 18 driving the guide rollers, paper feed sensor 16 and image scanner 19. Furthermore communication modem 21 is provided within the main body 2.

Figure 1:
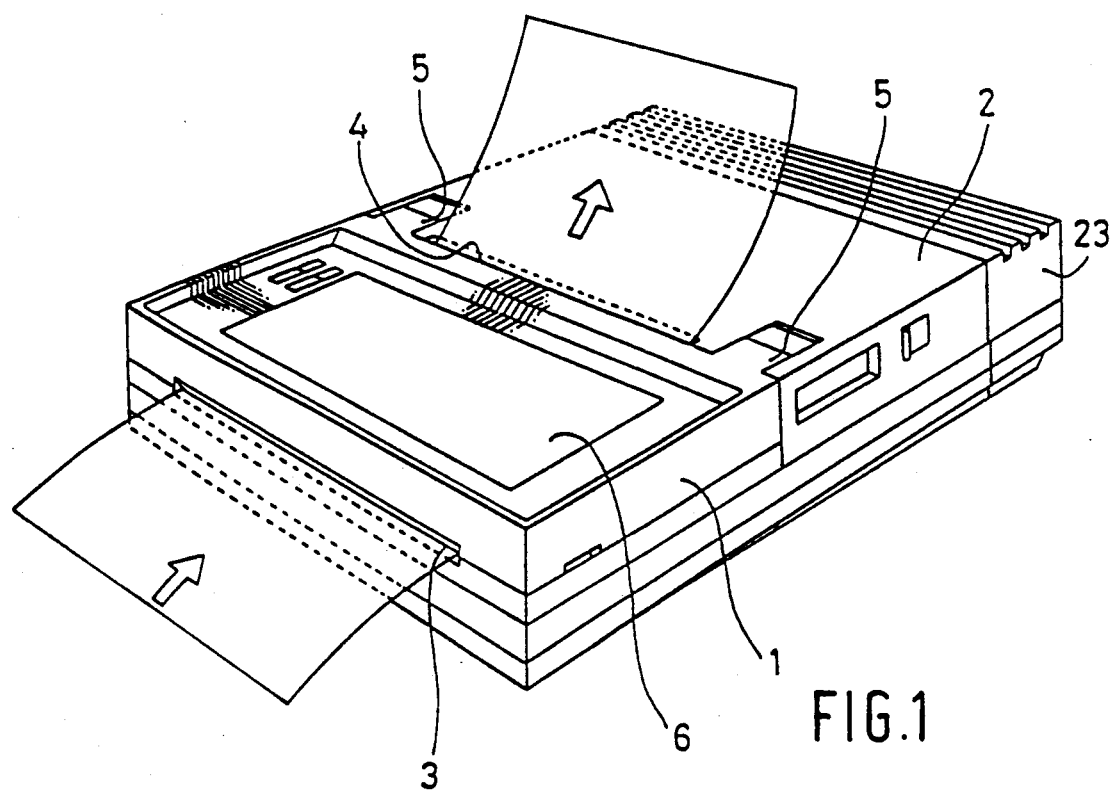
FIG. 1 is a perspective view of the portable computer according to the invention wherein a display module is closed.
Figure 2:
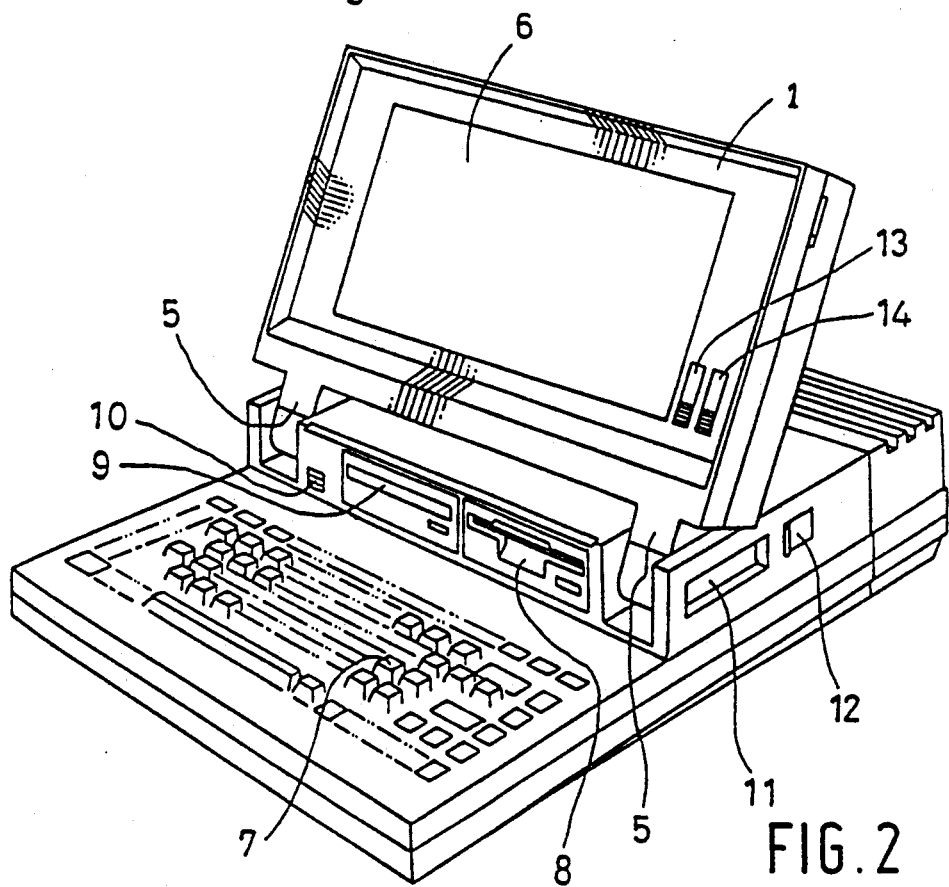
FIG. 2 is a perspective view of the computer according to the invention wherein a display module is raised.

Display module 1 is detachable at the pair of display connectors 5, and thereby be connected with the main body 2 via the hinge means in either way that display panel 6 faces the outside as shown in FIG. 1, or in a way that it is set in reverse as shown in FIG. 2. Electronic connection between main body 2 and display module 1 is made by display, connectors 5. When display module 1 is set in such a way as shown in FIG. 2 that the second major side of display module 1 faces the outside in a closed position color liquid crystal display panel 6, keyboard 7, etcetera can be protected from outside shock.

The keyboard 7, 3.5 inch CD ROM drive 9, 3.5 inch floppy disk drive 8 and power supply 23 are provided in main body 2. Furthermore hard disk drive 22, mother board 24 on which CPU, memories, a facsimile adapter, communication modem 21, etcetera are provided, are arranged in its inside. Mouse connector 12 and retractable handle 11 are provided on the right side wall of main body 2, while telephone line modular jack 25 and handset modular jack 26 are provided on the left side wall of it. In addition there are provided an expansion slot, a printer (facsimile and/or character) connector, RS-232C connector, analog RGB connector, etcetera on the rear side of it. Power supply 23 is designed in such a way that either AC supply or rechargeable batteries is usable.

The operation of the portable computer of the present invention will be explained. If a user sets display module 1 in the face direction and the position shown in FIG. 2, and loads a CD ROM disk in 3.5 inch CD ROM drive 9 and a floppy disk in 3.5 inch floppy disk drive, a user can compose a document and see data by operating keyboard 7. A mouse can be used, if required. When a telephone line is connected with telephone line modular jack 25 in the left side wall of main body 1, document files residing in the memory of the computer or information contained in the floppy disk can be transmitted to remote computers, or such information can be received from other computers. In addition a telephone becomes available by connecting a cord of a telephone to handset modular jack 26.

If a user intends to send a manuscript paper (e.g. of handwritten document, printings, pictures or the like) by facsimile in the configuration shown in FIG. 2, he sets it into paper feed slot 3 provided on the top wall of display module 1. He then inputs telephone numbers or the same concerning other machines to which the data should be sent from keyboard 7. The operation after this will be explained in accordance with FIG. 3. Under the condition wherein paper feed sensor 16 detects that manuscript paper has been set into slots, motor 18 starts to rotate in response to the direction signals to start the transmission. By the rotation of guide rollers 17, 20 actuated by motor 18, the manuscript paper fed from paper feed slot 3 moves to paper release slot 4. The information of the manuscript is read by image scanner 19, then converted into facsimile signals by a facsimile adapter integrated with scanner 19 and finally transmitted via modem 21 to other facsimile machines.

It is also possible to directly transmit the facsimile information to other computers instead of to facsimile machines.

On the other hand facsimile transmission is also possible in the condition wherein the direction which of display module 1 of the portable computer faces is reversed from that in FIG. 2 and display module 1 is closed down as shown in FIG. 1. In this case after manuscript paper is set into paper feed slot 3, telephone numbers, etcetera of other machines are input to the computer by touching with fingers keys shown on touch screen 15. If it is designed in such a way that touch screen 15 shows keys of "telephone dials", "transmission start", "transmission stop", etcetera, its operation will become easier.

In the above explanation, the information read by the image scanner is instantly transmitted to other facsimile machines or computers, but it is possible to transmit such information after checking it on the display, or to transmit it after a given time with a timer function.

When the information is transmitted to the computer of the present invention from another facsimile machine or computer, the download is performed for the information, which information can be printed out by an external printer, if necessary.

I claim:

1. A portable computer comprising:
   a main body having a keyboard, a disc drive, data processing means, and a communication modem;
   a display module pivotally connected to said main body, said display module having first and second mutually opposite major sides, a computer display panel on said first major side, a paper feed slot, a paper release slot, a manuscript paper path within the display module extending between said paper feed slot and said paper release slot, a paper feed sensor within said display module at a first place along said path near said paper feed slot, an image scanner means within said display module at a second place along said path for converting scanned information into digital signals, and guide rollers actuated by a motor and positioned at a plurality of further places along the manuscript paper path; and
   display connector means electrically connecting said display module to said main body so as to transport computer display drive signals from said main body to said display module.

2. A computer as claimed in claim 1, wherein said display panel is configured to display a page having a predetermined line incrementation direction along said display panel, and said manuscript paper path has a paper drive direction that is substantially parallel to said predetermined line incrementation direction.

3. A computer as claimed in claim 1, wherein said portable computer is a laptop computer.

4. A computer as claimed in claim 1, wherein said display connector means transports said digital signals from said display module to said main body.

5. A computer as claimed in claim 4, wherein said computer display module is connected to said main body by hinge means incorporating said display connector means, for in a closed position of said hinge means presenting said second major side of said display module as an external area of said computer.

6. A computer as claimed in claim 5, wherein in said closed position both said paper feed slot and said paper release slot are accessible.

7. A computer as claimed in claim 5, wherein said hinge means has a range of open positions, and said paper feed slot and said paper release slot both are accessible in at least a sub-range of said range.

8. A computer as claimed in claim 5, wherein said display connector means comprises mating portions which are detachable with respect to each other.

9. A computer as claimed in claim 8, wherein said mating portions of said display connector means mate each other in two states, in which two states said first and second major sides interchange their respective positions.

10. A computer as claimed in claim 9, wherein said display connector means comprises a pair of display connectors which are physically spaced apart from each other along a hinge axis of said hinge means.

11. A computer as claimed in claim 2, wherein touch screen means are provided for said computer display panel, and said display connector means, when said mating portions are mated in either of said two states, interconnect said display drive signals irrespective of the position of said hinge means.

* * * * *